United States Patent [19]
Mori et al.

[11] Patent Number: 5,649,254
[45] Date of Patent: Jul. 15, 1997

[54] FILM WINDING MECHANISM FOR A CAMERA

[75] Inventors: Ryosuke Mori; Kazunori Miyashita; Minoru Tanaka, all of Suwa, Japan

[73] Assignee: Seiko Epson Corporation, Tokyo, Japan

[*] Notice: The term of this patent shall not extend beyond the expiration date of Pat. No. 5,366,423.

[21] Appl. No.: 342,957

[22] Filed: Nov. 21, 1994

Related U.S. Application Data

[62] Division of Ser. No. 910,180, filed as PCT/JP91/01562, Nov. 14, 1991, Pat. No. 5,366,423.

[30] Foreign Application Priority Data

Nov. 14, 1990 [JP] Japan ................................. 2-307840

[51] Int. Cl.$^6$ ........................................... G03B 1/18
[52] U.S. Cl. ........................................ 396/411; 396/418
[58] Field of Search ..................... 354/173.1, 173.11, 354/212; 396/411, 418

[56] References Cited

U.S. PATENT DOCUMENTS

| | | | |
|---|---|---|---|
| 253,189 | 2/1882 | Davies | 254/342 |
| 595,703 | 12/1897 | Earll | 254/344 |
| 1,320,530 | 11/1919 | Buehler | 475/337 |
| 1,912,801 | 6/1933 | Stephenson | 475/342 |
| 2,033,749 | 3/1936 | Walter | 409/185 |
| 2,501,034 | 3/1950 | Derbyshire | 475/346 |
| 3,081,648 | 3/1963 | Duer | 475/345 |
| 3,261,234 | 7/1966 | Broschard et al. | 475/348 |
| 3,421,390 | 1/1969 | Lohr | 475/342 |
| 3,453,907 | 7/1969 | Noguchi et al. | 475/176 |
| 3,527,121 | 9/1970 | Moore | 475/338 |
| 3,939,736 | 2/1976 | Morin | 475/338 |
| 4,274,726 | 6/1981 | Yoneyama et al. | 354/173.1 |
| 4,366,727 | 1/1983 | Jonsson | 475/342 |
| 4,477,162 | 10/1984 | Matsumoto | 354/173.11 |
| 4,942,781 | 7/1990 | Hori | 475/342 |
| 4,959,672 | 9/1990 | Yoshino et al. | 354/173.1 |
| 4,967,213 | 10/1990 | Man | 354/173.1 |
| 5,168,295 | 12/1992 | Yoshihara et al. | 354/173.1 |
| 5,171,195 | 12/1992 | Funamoto | 475/342 |

FOREIGN PATENT DOCUMENTS

| | | |
|---|---|---|
| 3305151 | 8/1984 | Germany . |
| 59-23144 | 2/1984 | Japan . |
| 1-316546 | 12/1989 | Japan . |
| 1-316547 | 12/1989 | Japan . |
| 2-31047 | 2/1990 | Japan . |
| 4-311849 | 11/1992 | Japan . |
| 0264084 | 2/1970 | U.S.S.R. . |
| 691776 | 5/1953 | United Kingdom . |

*Primary Examiner*—Safet Metjahic
*Assistant Examiner*—Eddie C. Lee
*Attorney, Agent, or Firm*—Stroock & Stroock & Lavan LLP

[57] ABSTRACT

A mechanism for winding camera film includes a small size reduction gear which includes an internal gear rotatably mounted within the camera, an output shaft mounted on the internal gear to rotate therewith, and a cylinder coupled to the output shaft to rotate with the output shaft for receiving and winding film thereabout, the internal gear being a stationary internal gear; a movable internal gear having an internal gear, plane gears in mesh with the stationary internal gear and the movable internal gear. A holder and a holder clamp hold the plane gears. A sun gear meshing with the planet gears is directly connected with a motor shaft. The reduction gear includes a column beam provided between columns extending upwardly from the holder and, further, guide sections are provided in those sections where the movable internal gear and the stationary internal gear are in contact with each other.

2 Claims, 5 Drawing Sheets

FILM WINDING MECHANISM FOR A CAMERA

This is a divisional of U.S. patent application Ser. No. 07/910,180, filed as PCT/JP91/01562, Nov. 14, 1991, now U.S. Pat. No. 5,366,423.

TECHNICAL FIELD

Recently, various products are required to be reduced in size, increasing the demand for miniaturization of driving devices, such as a motor, and mechanism elements, such as a reduction gear. The present invention, which aims to meet such demand, relates to the speed reduction mechanism of a small-sized reduction gear which is directly connected to a driving device such as a small-sized motor for use as winding mechanism in a camera.

BACKGROUND ART

FIG. 5 shows an example of a conventional small-sized reduction gear of this type, which employs a planetary gear mechanism. In FIG. 5, a sun gear 103 is fitted onto a motor shaft 102 which is at the center of a small-sized motor 101. A lower case 104 is threadedly connected with the small-sized motor 101, with the motor shaft 102 serving as a common central axis. The lower case 104 is equipped with an internal gear 105, and two to four planet gears 106 are provided between the internal gear 105 and the sun gear 103. The plurality of planetary gears 106 mesh with the sun gear 103 and mesh with the internal gear 105. The centers of the plurality of planet gears 106 are connected by a holder member 107, and an output shaft gear 109 is provided at the center of the holder member 107. An intermediate carrier member 108 is connected to the lower case 104 and constitutes a bearing for the output shaft gear 109. The output shaft gear 109 is in mesh with the planet gears 106, which are in mesh with the internal gear 105. The gear at the center provides a driving force, which is transmitted through the planet gears 106 to the holder member 107 so as to rotate the same. The components which are thus operatively connected constitute a unit. When a high reduction ratio is to be obtained, a number of such units are stacked one upon another. In the last stage of this stacked structure, an output shaft 110 exists at the center of rotation of the holder member 107.

Further, Japanese Patent Laid-Open No.1-316545 and 1-316546, filed by the present inventors, disclose small-sized reduction gears using a planetary gear mechanism. These reduction gears provide an improvement over the above-described conventional reduction gear.

In small-sized reduction gears using a planetary gear mechanism having such a conventional construction, speed reduction is effected in the course of transmission from the sun gear 103 to the holder member 107 through the planet gears 106. In such reduction gears, the reduction ratio effected by one planetary gear unit is small, so that a large number of units must be stacked together before a large reduction ratio can be obtained. Since a large number of gears are thus combined to effect speed reduction, a great number of gear parts have to be used, resulting in high production costs. Further, this involves a high noise level, as well as a poor transmission efficiency and much backlash due to the mesh of a large number of gears. The small-sized reduction gears according to Japanese Patent Laid-Open No. 1-316545 and 1-316546 have other problems. For example, they have a low rupture strength against external forces, and are liable to be disabled from functioning properly when deformed by external forces.

The present invention aims to solve these problems in the prior art. It is an object of the present invention to attain a reduction in the number of parts and production costs and to provide, at low costs, a highly strong small-sized reduction gear which is small and light in weight, which involves low noise, which provides a high reduction ratio and a high level of transmission efficiency, and which offers high rupture strength despite its small size.

DISCLOSURE OF THE INVENTION

In accordance with the present invention, there is provided a mechanism for use in a camera for winding film including an internal gear rotatably mounted within the camera, an output shaft rotatably mounted on the internal gear to rotate therewith, a cylinder coupled to the shaft. In one embodiment, the internal gear being small-sized reduction gear comprising: a stationary internal gear 10 having an internal gear whose number of teeth is n; a movable internal gear 20 having an internal gear whose number of teeth is n±m, where m equals 1 through 4 two planet gears 12 each having Z external teeth which are in mesh with the stationary internal gear 10 and the movable internal gear 20; a holder member 15 and a holder clamp 19 which hold the planet gears 12; and a sun gear 4 which has e teeth in mesh with the planet gears 12 and which is directly connected with a motor shaft 3; wherein (1) a support beam 18 is provided between columns 15c extending upwardly from the holder member 15;

(2) guide sections are provided in sections where the movable internal gear 20 and the stationary internal gear 10 are in contact with each other; and (3) the components constituting the different sections of the reduction gear are at least partly formed of a synthetic resin containing a reinforcement fiber, or a synthetic resin containing a reinforcement fiber and a lubricant, thereby making it possible to obtain, with a far less number of parts than in the case of conventional small-sized reduction gears, a small-sized reduction gear which provides a high reduction ratio and a high level of transmission efficiency, which involves little backlash and noise, which excels in dustproofness, and which can be produced at low costs. Further, the reduction gear of the present invention can be inserted, together with a motor, into a cylinder which is to be rotated, thereby making it possible to attain a great reduction in size as compared to the case where the rotation is effected with the gears placed outside the cylinder that is to be rotated. Thus, it provides a space saving effect. Further, since the motor and the reduction can be lodged together in the cylinder, the volume of the sound outwardly emitted can be reduced to a very low level, thereby attaining a reduction in noise.

BEST MODE FOR CARRYING OUT THE INVENTION

Figure 1:
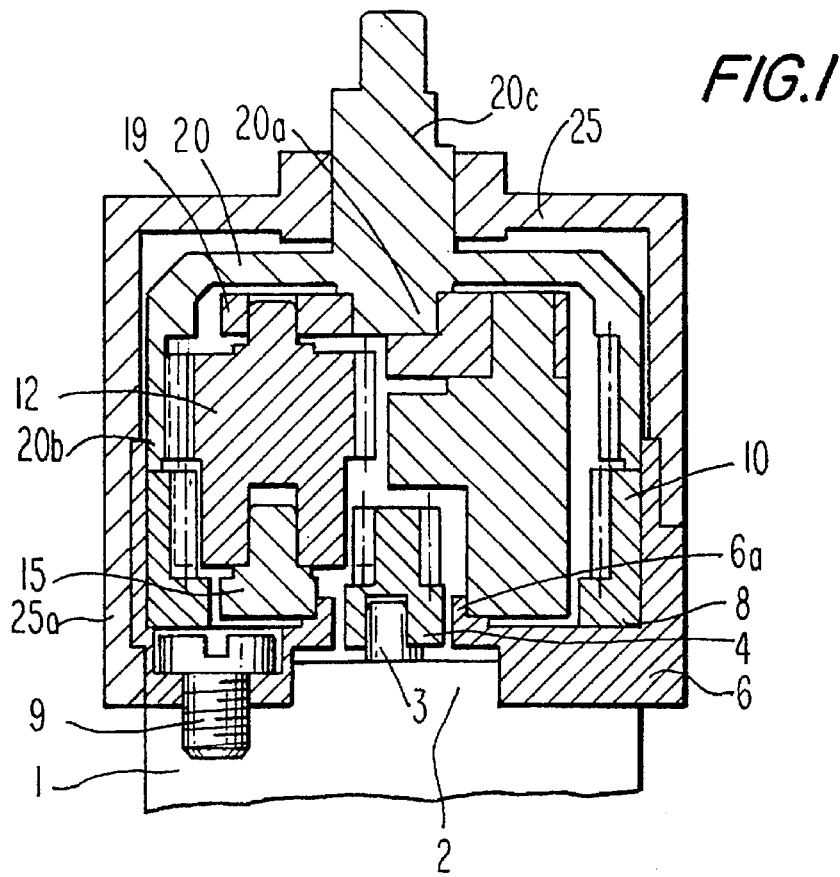
FIG. 1 is a sectional view taken along lines X and Y of FIG. 2.
Figure 2:
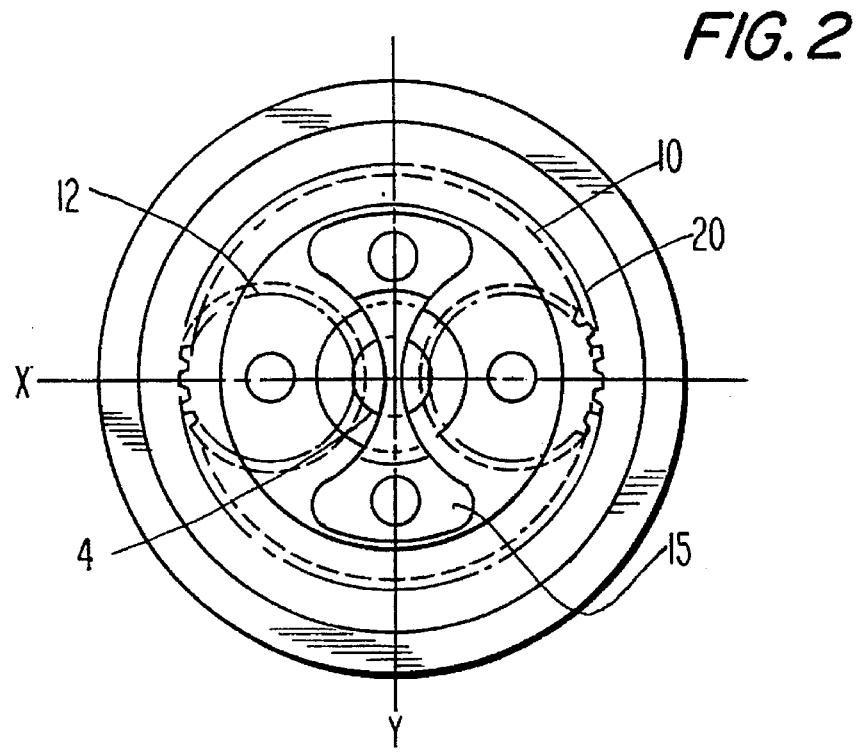
FIG. 2 is a top plan view of a small sized reduction gear constructed in accordance with the invention.
Figure 3:
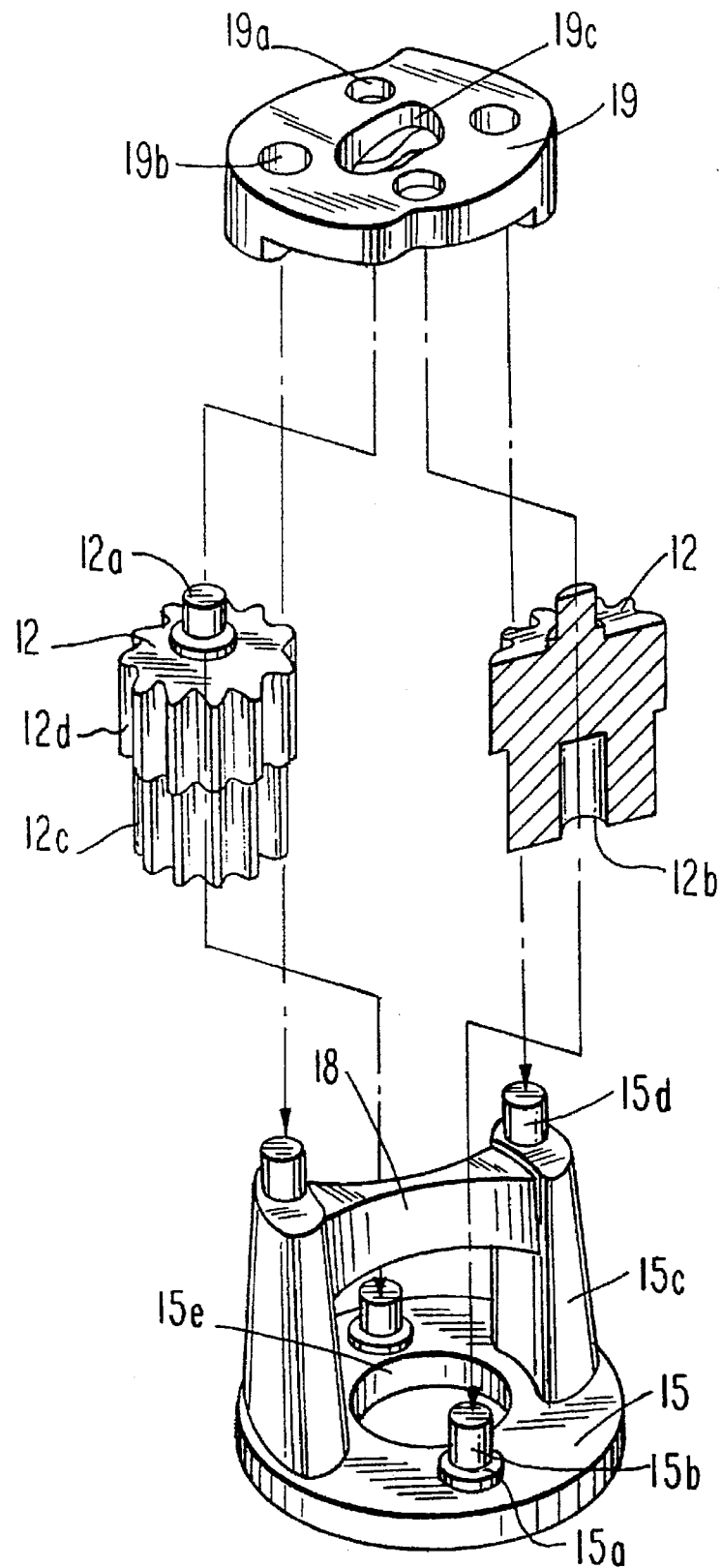
FIG. 3 is a partial sectional exploded view of the invention showing in detail a part of a planetary gear unit.
Figure 4:
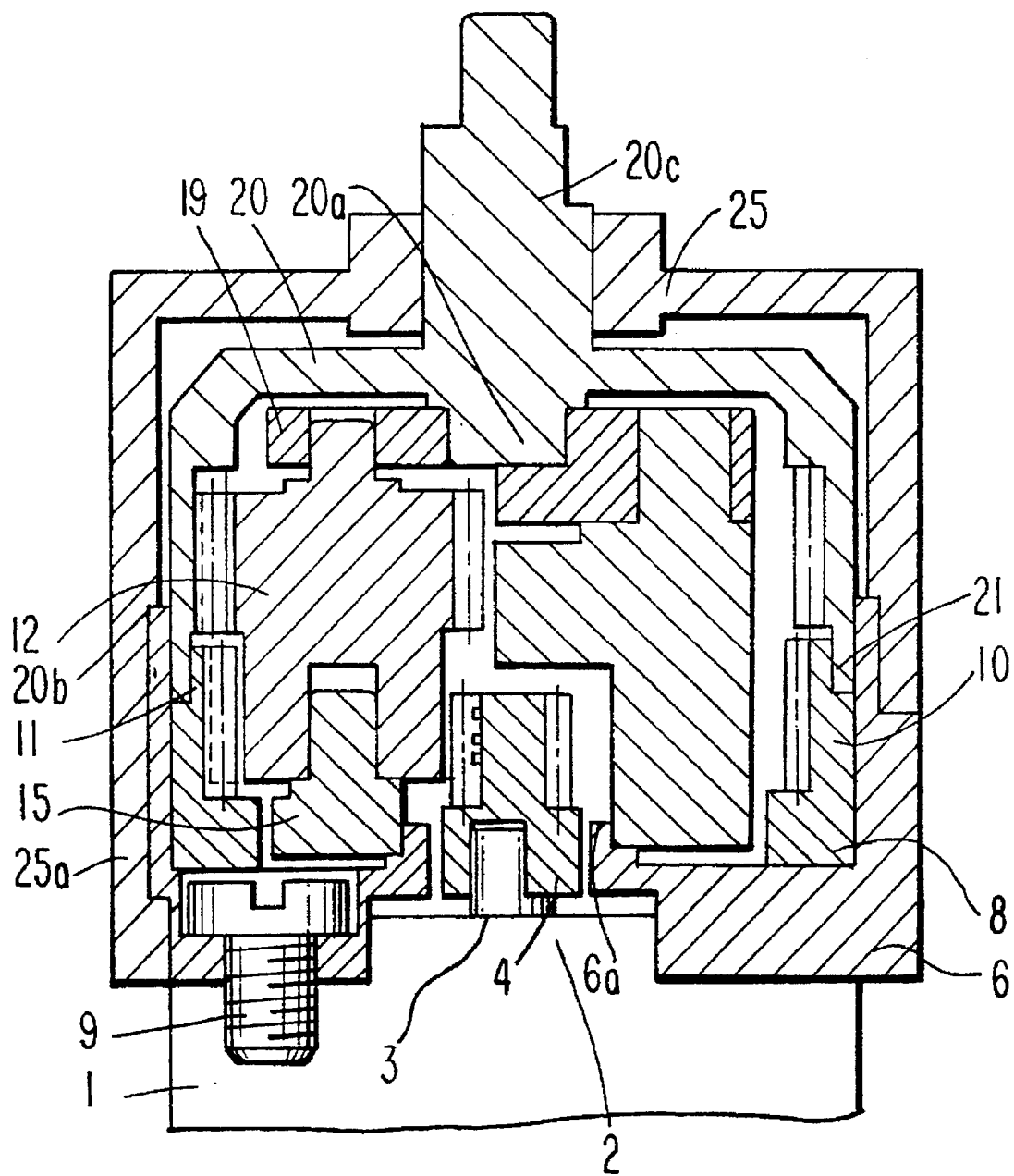
FIG. 4 is a sectional view of a small-sized reduction gear in accordance with another embodiment of the present invention.
Figure 5:
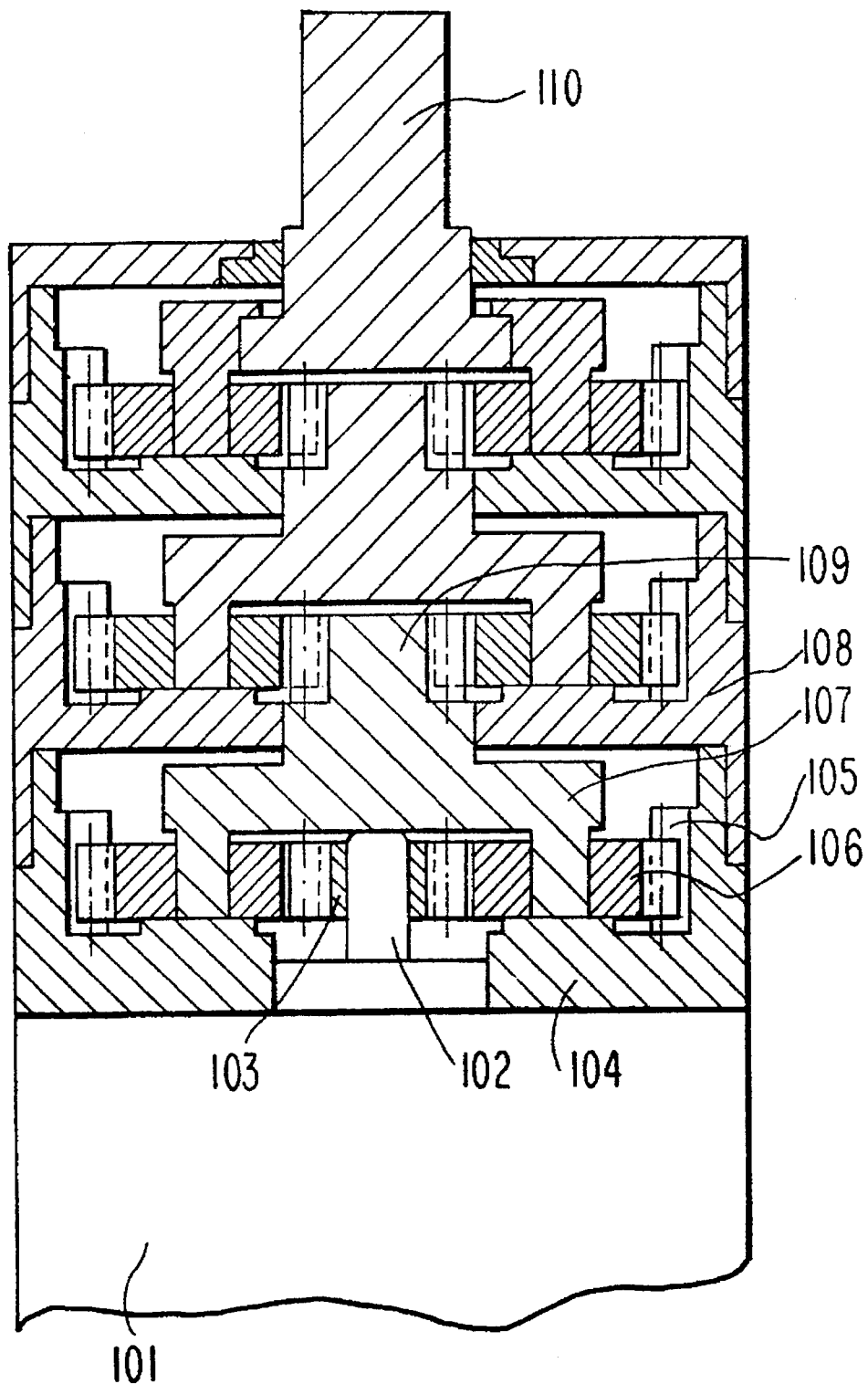
FIG. 5 is a sectional view of a reduction gear constructed in accordance with the prior art.

An embodiment of the present invention will now be described with reference to FIGS. 1, 2, 3 and 4. FIG. 2 is a plan view of a small-sized reduction gear according to the present invention; FIG. 1 is a sectional view taken along the lines X and Y of FIG. 2; FIG. 3 is a partially cutaway detailed view of a part of a planetary gear unit; and FIG. 4 is a sectional view showing another embodiment of the small-sized reduction gear of the present invention.

First, the basic structure of the small-sized reduction gear of the present invention will be described. In FIG. 1, a small-sized motor 1 has a motor boss 2 and a motor shaft 3 which are arranged in alignment with the central axis of the small-sized motor 1, and a sun gear 4 is fitted onto the motor shaft 3. Components concentrically arranged with respect to the motor shaft 3 are: the sun gear 4, a lower case 6, a stationary internal gear 10, a holder member 15, a holder clamp 19, a movable internal gear 20, and an upper case 25. Other components are planet gears 12 and a fastening screw 9. The lower case 6, which is guided and positioned by the motor boss 2, is secured to the small-sized motor 1 by the fastening screw 9. The stationary internal gear 10 is secured in position with respect to the lower case 6 by a tooth-shaped detent 8. The tooth-shaped detent 8 has a tooth-like configuration; when, for example, the lower case 6 is equipped with a male tooth, the stationary internal gear 10 is equipped with a female tooth, the two teeth being engaged with each other to be fixed in position.

In an exemplary embodiment the number of the planet gears 12 is two. In some contemplated embodiments as many as four planet gears may be utilized. Planet gears 12 are arranged to be in mesh with and in point symmetry with respect to the sun gear 4. The planet gears 12 are also in mesh with the stationary internal gear 10 and the movable internal gear 20. The planet gears 12 are held by the holder member 15 and the holder clamp 19 such that their central axes are always kept parallel to the central axis of the sun gear 4. These components, arranged in the manner described above, constitute a planetary gear unit. FIG. 3 shows the planetary gear unit in detail. Each planet gear 12 has a planet-gear shaft 12a and a planet-gear bearing hole 12b, and is supported at both ends by a shaft and a bearing hole which are respectively provided on the holder member 15 and the holder clamp 19. The holder member 15 includes a planet-gear support stand 15a and planet-gear bearing shafts 15b, which serve as a bearing at one end of each planet gear 12, and further, columns 15c for positioning and holding the holder clamp 19 in the vertical direction, guide shafts 15d received by clamp 19 for securing the holder clamp 19 in position, and a holder-member bearing 15e. The holder clamp 19 comprises bearing holes 19a for the planet gears 12, connecting holes 19b for connecting the holder clamp 19 with the holder member 15, and a holder-clamp bearing 19c. By assembling the planet gears 12 by means of the holder member 15 and the holder clamp 19 and securing them in position, a planetary gear unit is formed. Although in this embodiment each planet gear 12 is equipped with a shaft and and a bearing hole so as to avoid assembly errors, it is also possible for each planet gear to have shafts or bearing holes only.

The planetary gear unit is supported at its lower end by the holder-member bearing 15e and a holder-member support section 6a of the lower case 6, and, at its upper end, by the holder-clamp bearing 19c of the holder clamp 19 and a holder-clamp support section 20a of the movable internal gear 20. Thus supported at both ends, the planetary gear unit rotates around the sun gear 4. The movable internal gear 20 includes an outer peripheral section 20b on the outer side of the internal teeth section and an output shaft section 20c at the center. The outer peripheral section 20b and the lower case 6 at the lower end, and the output shaft section 20c and the upper case 25 at the upper end form bearing sections for supporting the unit at both ends. Movable internal gear 20 rotates around the central axis of the sun gear 4. The upper case 25 has a pawl 25a, for securing upper case 25 to the lower case 6, and, while also serving as a bearing for the output shaft section 20c, covers the entire small-sized reduction gear. In this way, the movable internal gear 20 is supported by the lower case 6, and the planetary gear unit is supported at its both ends by the movable internal gear 20 and the lower case 6, whereby the planetary gear unit can always be kept parallel to the central axis of the sun gear 4, with the result that the transmission efficiency of the gears is improved.

The tooth section of each planet gear 12 consists of a planet-gear tooth section A, which is indicated at 12c, and a planet-gear tooth section B, which is indicated at 12d. The planet-gear tooth section A of the planet gear 12, indicated at 12c, is in mesh with both the tooth section of the sun gear 4 and the tooth section of the stationary internal gear 10. The planet-gear tooth section B of the planet gear 12, indicated at 12d, is in mesh with the tooth section of the movable internal gear 20.

The planet-gear tooth section A, indicated at 12c, and the planet-gear tooth section B, indicated at 12d, of the planet gear 12 have the same number (=Z) of teeth. While they are somewhat different in module, these tooth sections coincide with each other in tooth phase. Accordingly, when the sun gear 4, whose number of teeth is e, starts to rotate, each planet gear 12 starts both rotation and revolution since the stationary internal gear 10 remains stationary. The number of teeth of the stationary internal gear 10 is n, and the number of teeth of the movable internal gear 20 is n±m, m=1 through 4. As a result, the rotation and revolution of the planet gears 12 causes a difference to be generated between the tooth sections of the stationary internal gear 10 and the movable internal gear 20, whereby the movable internal gear 20 is rotated at a reduced speed. This relationship may be represented as follows:

$$\text{Reduction ratio} = \left(\frac{n}{e} + 1\right) \times \left(\frac{(n \pm m/\pm m)}{\pm 1 - 4}\right)$$

In the above expression, m has a value which ranges from 1 to 4 and consists of an integer, which is the same in both numerator and denominator.

In this way, the rotation of the sun gear 4 transmits to the movable internal gear 20 a reduced rotation and increased torque, which are output to the output shaft section 20c.

As shown in FIG. 2, the number of the planet gears 12 is two. Accordingly, the difference between the number of teeth of the movable internal gear 20 and the number of teeth of the stationary internal gear 10 is two. Theoretically, the number of the planet gears might be one. From the viewpoint of balance of forces, however, the number should range from two to four; three is the most preferable number. From the above formula, however, the number of planet gears is also limited by reduction ratio.

Thus, a high reduction ratio can be achieved through the mesh of a small number of gears, so that the deterioration in transmission efficiency due to the mesh is small, resulting in a high efficiency of transmission from input to output. As a result, it is possible to generate a large torque in the output shaft section 20c.

This requires the portion around the output shaft section 20c to be strong enough to withstand large torque. In this regard, this mechanism has a structure which is basically capable of withstanding large torque. First, when substituted for the torque of the tooth section of the movable internal gear 20, the output shaft torque is relatively small because of the large distance from the center, so that the force applied to the tooth section is small. Further, there exist a plurality of planet gears 12. Moreover, the mesh ratio between the tooth section of the movable internal gear 20 and the tooth sections B of the planet gears 12, indicated at 12d, is large. Due to these factors, the load per tooth applied to the tooth section of the movable internal gear 20, the tooth sections B of the planet gears 12, indicated at 12d, the tooth sections A of the planet gears 12, indicated at 12c, and the tooth section of the stationary internal gear 10, may be relatively small. As a result, an increase in the torque of the output shaft section 20c is attained.

Further, since a high reduction ratio can be attained through a combination of a small number of gears, little backlash is involved. Moreover, since the number of parts is reduced, a small-sized reduction gear is realized which can be produced at low costs. In addition, the reduction gear mechanism is sealed by means of the lower case 6 and the upper case 25, a small-sized reduction gear is realized which involves a low level of noise and which is protected against the intrusion of dust.

As shown in FIG. 3, a first feature of the present invention is that a column beam 18 is provided between the columns 15c of the holder member 15, thereby substantially increasing the rigidity of the entire holder member 15. If there were no column beam 18, any load applied to the output shaft section 20c would cause a force of action to be applied to the tooth sections A, 12c, of the planet gears 12, and a force of reaction to be applied to the tooth sections B, 12d, of the planet gears 12, thereby causing a bending force to e applied to the columns 15c of the holder 15 to cause a deformation thereof. If the columns 15c are bent, the central axes of the planet gears 12 will be inclined, with the result that the annulus-row efficiency of the reduction gear mechanism is seriously deteriorated. The column beam 18 will provide a sufficient effect if it is formed as a straight beam connecting the columns 15c with each other. In this embodiment, however, the column beam 18 is rounded with arcs which are concentric to the support positions of the planet gears and which have a diameter larger than the maximum diameter of the planet gears so as to avoid interference with the planet gears 12. Due to this arrangement, those sections of the column beam 18 where it is joined with the columns 15c can be made thick, thereby attaining a further improvement in rigidity. As a result, the holder 15 is not substantially deformed if a bending force is applied thereto, so that it is possible to prevent a deterioration in the annulus-row efficiency of this reduction gear mechanism even under a high-load condition.

As shown in FIG. 4, a second embodiment of the present invention is that the movable internal gear 20 and the stationary internal gear 10 have, in those sections where they are in contact with each other, holder sections adapted to guide each other. The movable internal gear 20 has, at the lower end of its outer periphery, a ring-like movable-internal-gear protrusion 21, and the stationary internal gear 10 has, at its upper end, a ring-like stationary-internal-gear protrusion 11. The inner peripheral surface of the movable-internal-gear protrusion 21 and the outer peripheral surface of the stationary-internal-gear protrusion 11 are fitted together, whereby the movable internal gear 20 is guided by the stationary internal gear 10. In the first embodiment described above, in which the positioning of the movable internal gear 20 and the stationary internal gear 10 is effected through the intermediation of the lower case 6, the guiding is likely to be performed inaccurately depending upon the precision of the components. In this embodiment, the movable internal gear 20 and the stationary internal gear 10 are directly guided, so that the guiding can be effected accurately, resulting in an improvement in the transmission efficiency of the gears. In respect of the tooth strength of the reduction gear, the tooth strength obtained in the above-described first embodiment is approximately 5 kgf, whereas, in the tooth strength obtained in this embodiment is approximately 6 kgf, thus making attaining an increase in strength of 20%. While the guiding can be effected by the method described above, it can also be effected by reversing the movable and stationary internal gears, that is, either of them may be on the inner side. Further, the same effect can be obtained by other guiding methods. For example, it is possible to provide one of the internal gears with a protrusion, and the other one with a recess.

Further, the components of the small-sized reduction gear of the present invention may be partly or entirely formed of a synthetic resin reinforced by glass or a reinforcement fiber such as a whisker, or a synthetic resin containing a lubricant such as polyolefine, fluororesin or oil, or a synthetic resin containing both a reinforcement fiber and a lubricant, thereby improving the gear transmission efficiency by utilizing the low friction coefficient of a synthetic resin, realizing a gear having a high rupture strength through the employment of a highly rigid material containing a reinforcement resin, and providing a low-noise small reduction gear due to the structure formed of a synthetic resin. Further, by using a liquid crystal polymer having a satisfactory vibration absorbing property, a further reduction in noise can be achieved.

Examples of the synthetic resin used are as follows: the base polymer may be polyacetal resin, polyamide resin, or polyester resin; the base polymer may be appropriately blended with carbon fiber, whisker, glass fiber, mica or the like. Such blended synthetic resins are suitable for use as the material since they provide a satisfactory strength and have a low friction coefficient of 0.2 or less. Those synthetic resins which consist of polyacetal resin or polyamide resin blended with an appropriate amount of carbon fiber or whisker are suitable for use as the material since they have a large flexural strength of 2000 kg/cm$^2$ or more.

Polyamide-type synthetic resins containing a filler or a whisker and a lubricant have a high level of strength and a low friction coefficient, so that they are particularly suitable for use as the material. A synthetic resin whose content of filler or whisker is 20 to 40% and whose content of the lubricant is 5 to 20% has a flexural strength of 2800 kg/cm$^2$ and a friction coefficient of approximately 0.1, so that when used as the material for the gear parts and the holder, it helps to realize a small-sized reduction gear which is particularly capable of withstanding high torque and which provides a high level of efficiency. Further, the use of a synthetic resin also helps to reduce the weight of the small-sized reduction gear.

When used, for example, to move the lens of a still camera, a VCR camera or the like, or to load or drive a VCR tape, an audio tape or the like, such a small-sized, lightweight and low-noise reduction gear makes it possible to attain a reduction in the size and weight of the product concerned. Further, when used in a toy, the small-sized reduction gear also helps to attain a reduction in size and weight and to realize an efficient utilization of space. For example, it may be used in the driving section of a toy car or robot for children. In this way, the small-sized reduction gear of the present invention has a wide range of applications. Further, although the most preferable driving device is a motor, it is also possible to adopt other types of driving devices to describe the small sized reduction gear, such as a spiral spring.

Figure 6:
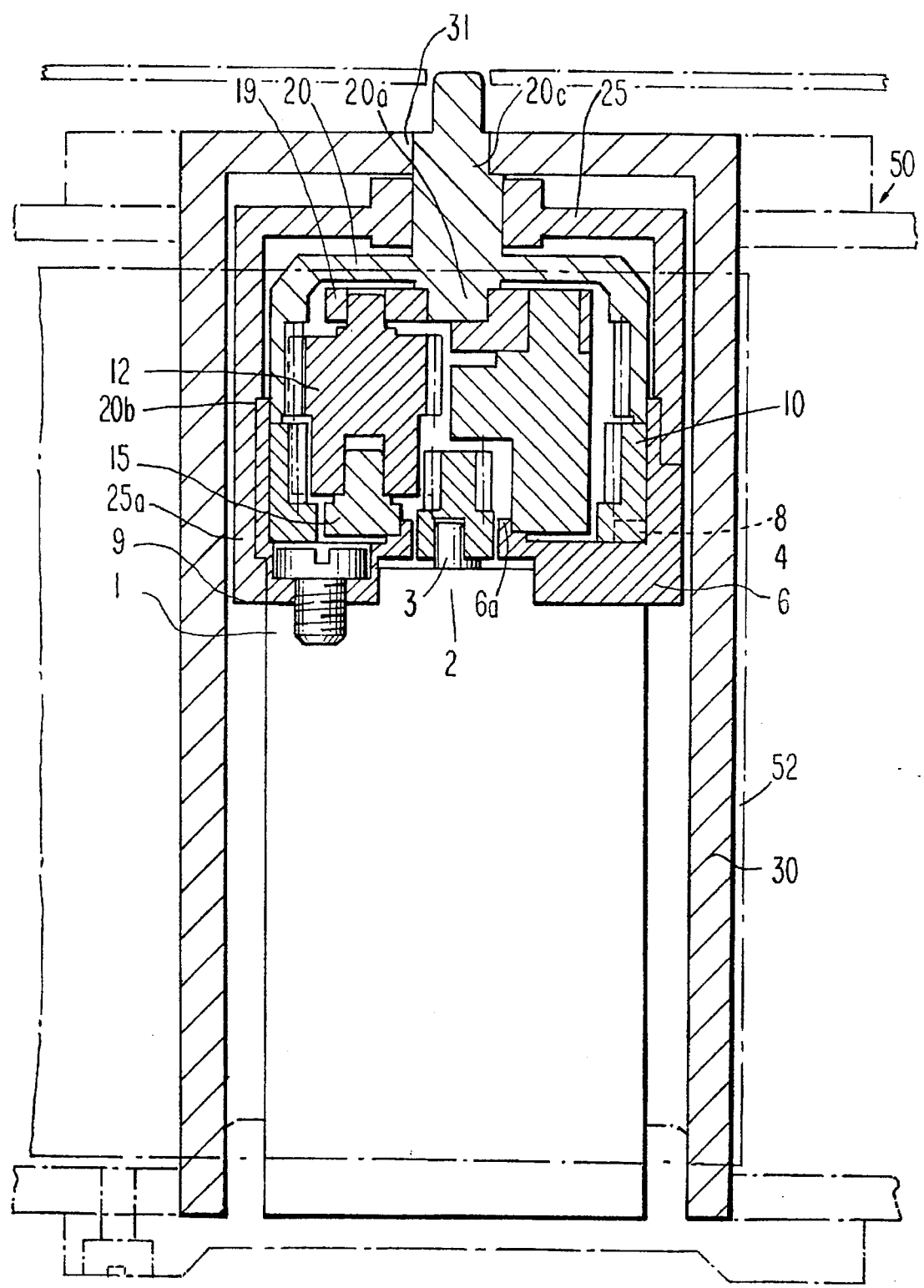
FIG. 6 is a sectional view of the small sized reduction gear constructed in accordance with the invention as used in a cylinder for a camera, the camera being shown in phantom.

FIG. 6 shows a sectional view of an application example of the small-sized reduction gear of the present invention. The small-sized reduction gear of the present invention is incorporated into a cylinder 30. The output shaft section 20c of the small-sized reduction gear is connected to a connecting section 31 of the cylinder 30, and the torque of the output shaft section 20c of the small-sized reduction gear is transmitted to the cylinder 30 to rotate the same. Thus, a motor and a reduction gear can be incorporated together into a cylinder which is to be rotated, so that a substantial reduction in size can be attained as compared to the case where the gear is placed outside the cylinder to be rotated, thus obtaining a space saving effect. Further, since the motor and the reduction gear are arranged inside the cylinder, the volume of the sound emitted outwardly can be further lowered, thereby attaining a reduction in noise. In an example of such an application, the above-mentioned cylinder 30 is used as a cylinder for winding up the film 52 of a still camera 50 of the type in which the film 52 is extracted from the film case and wound around the cylinder 30. By thus applying the invention to the winding of a film of a still camera 50, it is possible to utilize the space inside the still camera 50 efficiently, and the quality of the still camera 50 as a product can be improved through reduction in size, noise and weight. Further, a similar effect can be obtained even when the output shaft section 20c of the reduction gear is, as shown in FIG. 6, not directly connected with the cylinder 30 situated in the periphery thereof. Further, the output torque of the output shaft section 20c may be connected to the cylinder 30 in the periphery through a gear, a cam or the like. In that case, the output shaft section 30 assumes a configuration corresponding to the gear, cam or the like.

What is claimed is:

1. A camera comprising a film winder, said film winder including an internal gear rotatably mounted within said camera, said internal gear being a reduction member, an output shaft formed on said internal gear to rotate therewith; a cylinder coupled to said internal gear; at least one planet gear meshing with said internal gear, and a sun gear meshing with said at least one planetary gear, said motor being directly coupled to said sun gear, said internal gear being disposed within said cylinder and said output shaft being coaxial with said cylinder so that film is captured by said cylinder and wound thereabout as said cylinder rotates; and a holder member, said at least one planet gear being supported in part by said holder member, at least two columns extending axially from said holder member, and at least one column beam extending radially across said sun gear and mechanically coupled to said first column and said second column.

2. The camera of claim 1, wherein said column beam is formed of a plastic material.

* * * * *